(12) United States Patent
Steen et al.

(10) Patent No.: US 8,257,672 B2
(45) Date of Patent: Sep. 4, 2012

(54) METHOD FOR PREVENTING RE-EMISSION OF MERCURY FROM A FLUE GAS DESULFURIZATION SYSTEM

(75) Inventors: William A. Steen, Austin, TX (US);
John E. Currie, Round Rock, TX (US);
Gary M. Blythe, Austin, TX (US);
Jennifer L. Paradis, Austin, TX (US);
David W. DeBerry, Austin, TX (US);
Judith Gres DeBerry, legal representative, Austin, TX (US)

(73) Assignee: URS Corporation, Austin, TX (US)

( * ) Notice: Subject to any disclaimer, the term of this patent is extended or adjusted under 35 U.S.C. 154(b) by 18 days.

(21) Appl. No.: 12/910,330

(22) Filed: Oct. 22, 2010

(65) Prior Publication Data

US 2011/0262326 A1  Oct. 27, 2011

Related U.S. Application Data

(60) Provisional application No. 61/279,550, filed on Oct. 22, 2009.

(51) Int. Cl.
*B01D 53/64* (2006.01)
(52) U.S. Cl. .................................................. 423/210
(58) Field of Classification Search ................... 423/210
See application file for complete search history.

(56) References Cited

U.S. PATENT DOCUMENTS

2005/0260112 A1* 11/2005 Hensman .................... 423/210
2011/0076246 A1*  3/2011 Haley et al. ................ 424/78.27

* cited by examiner

*Primary Examiner* — Timothy Vanoy
(74) *Attorney, Agent, or Firm* — DuBois, Bryant & Campbell, LLP; William D. Wiese

(57) ABSTRACT

An improvement in the method for preventing re-emissions of mercury from a wet flue gas desulfurization (FGD) system by addition of an additive to the FGD scrubber liquor which interacts in the system scrubber with mercury present in the flue gas to curtail the mercury re-emissions; the mercury re-emissions are reduced to substantially zero by use of an additive selected from one or more members of the group consisting of a dithiol, a dithiolane, and a thiol having a single thiol group and either an oxygen or a hydroxyl group.

13 Claims, 5 Drawing Sheets

METHOD FOR PREVENTING RE-EMISSION OF MERCURY FROM A FLUE GAS DESULFURIZATION SYSTEM

PRIORITY STATEMENT UNDER 35 U.S.C. §119 & 37 C.F.R. §1.78

This non-provisional application claims priority based upon prior U.S. Provisional Patent Application Ser. No. 61/279,550 filed Oct. 22, 2009 in the name of William A. Steen, John E. Currie, Gary M. Blythe, Jennifer L. Paradis and David W. DeBerry entitled "Method for Preventing the Re-emission of Elemental Mercury from a Flue Gas Desulfurization System," the disclosure of which is incorporated herein in its entirety by reference.

BACKGROUND OF THE INVENTION

This invention relates generally to reducing the emission of vapor phase mercury in flue gas emissions, thereby restoring air quality and enhancing the environment, and more specifically relates to minimizing the re-emission of mercury from a wet flue gas desulfurization ("FGD") system through the addition of additives during desulfurization.

Several industrial processes, including the conversion of coal to power, include scrubbers for removal of acid gases, such as hydrochloric acid and sulfur dioxide. Hydrochloric acid is typically removed by dissolution in water and the resulting liquor is then neutralized with a substance such as lime. Sulfur dioxide is typically removed with a wet flue gas desulfurization scrubber, wherein the flue gas containing sulfur dioxide is placed in contact with water containing an alkaline material, such as limestone, lime, magnesium compounds or sodium compounds. In the scrubber, the alkaline material reacts with the sulfur dioxide to form a neutral compound such as calcium sulfate dehydrate (i.e. gypsum).

In some feed stocks, such as coal, mercury is present in small quantities. The mercury is oxidized to varying degrees when the coal is combusted, or it can be oxidized in separate unit operations designed for that purpose or for the removal of other pollutants. The portion of the mercury that remains as elemental mercury)($Hg^0$) is gaseous and is water insoluble and will, therefore, pass through the scrubber without being affected. There are a number of methods known in the art for removing elemental mercury from flue gas.

The portion of the mercury that is oxidized is water soluble (e.g. ionic mercury) and will be absorbed into the scrubber solution. The oxidized mercury will leave the scrubber with the scrubber solution by an outlet liquid or solid stream. If the mercury stays in its oxidized, water-soluble form it can be removed by the flue gas desulfurization water slurry, commonly referred to as the "FGD liquor", is discharged into the environment. Unfortunately, the oxidized mercury is sometimes reduced back to its elemental form, vaporized, and released into the atmosphere as part of the scrubbed flue gas in a process referred to as "mercury re-emissions."

Several strategies are currently being developed to control the re-emission of mercury, many involving the addition of proprietary chemicals to the FGD liquor intended to either keep the mercury in its soluble form or precipitate it as a solid. Other control strategies involve the use of materials to adsorb mercury (e.g. activated carbon or gold).

SUMMARY OF THE INVENTION

The present invention provides a simple, efficient and cost effective method for minimizing or eliminating the amount of oxidized mercury present in the wet flue gas desulfurization system that is reduced and subsequently re-emitted. More specifically, by adding certain chemical additives to FGD liquors mercury re-emission is virtually eliminated during desulfurization. In one embodiment of the present invention, the additive can be introduced into the scrubber with the limestone slurry which is added to control $SO_2$.

Additives useful in the present invention are selected from one or more members of the group consisting of certain thiols, a dithiol or a dithiolane; many additives also have oxygen-containing functional groups. For example, the dithiol may include a doubly-bonded oxygen (O=) and/or a hydroxyl group (—OH). Preferable dithiols include 1,8 octanedithiol, dimercaptosuccinic acid, and 2,3-dimercaptopropanol. The dithiolane may include a doubly-bonded oxygen (O=) and a hydroxyl group (OH—); and preferable thiolanes include 2-methyl 1,3-dithiolane and 1,2-dithiolane-3-valeric acid. Preferable thiols are those having a single thiol group, and either an oxygen or a hydroxyl group. These include mercaptoacetic acid and the sodium salt of mercaptoacetic acid.

The foregoing has outlined rather broadly certain aspects of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is directed to improved methods for minimizing the re-emission of mercury in a flue gas desulfurization system. The configuration and use of the presently preferred embodiments are discussed in detail below. It should be appreciated, however, that the present invention provides many applicable inventive concepts that can be embodied in a wide variety of contexts other than traditional flue gas desulfurization processes. Accordingly, the specific embodiments discussed are merely illustrative of specific ways to make and use the invention, and do not limit the scope of the invention. In addition, the following terms shall have the associated meaning when used herein:

"power plant" means any plant using furnaces, boilers or heaters consuming coal, oil or any solid, liquid or gaseous fuel from which flue gas is discharged;

"reagent solids" means any reagent known in the art for use in a FGD process, including hydrated lime, limestone, soda ash, nahcolite, and dolomite; and "wet scrubbing system" and similar terms mean any system designed for solid particle or $SO_x$ removal during flue gas discharge.

Figure 1:
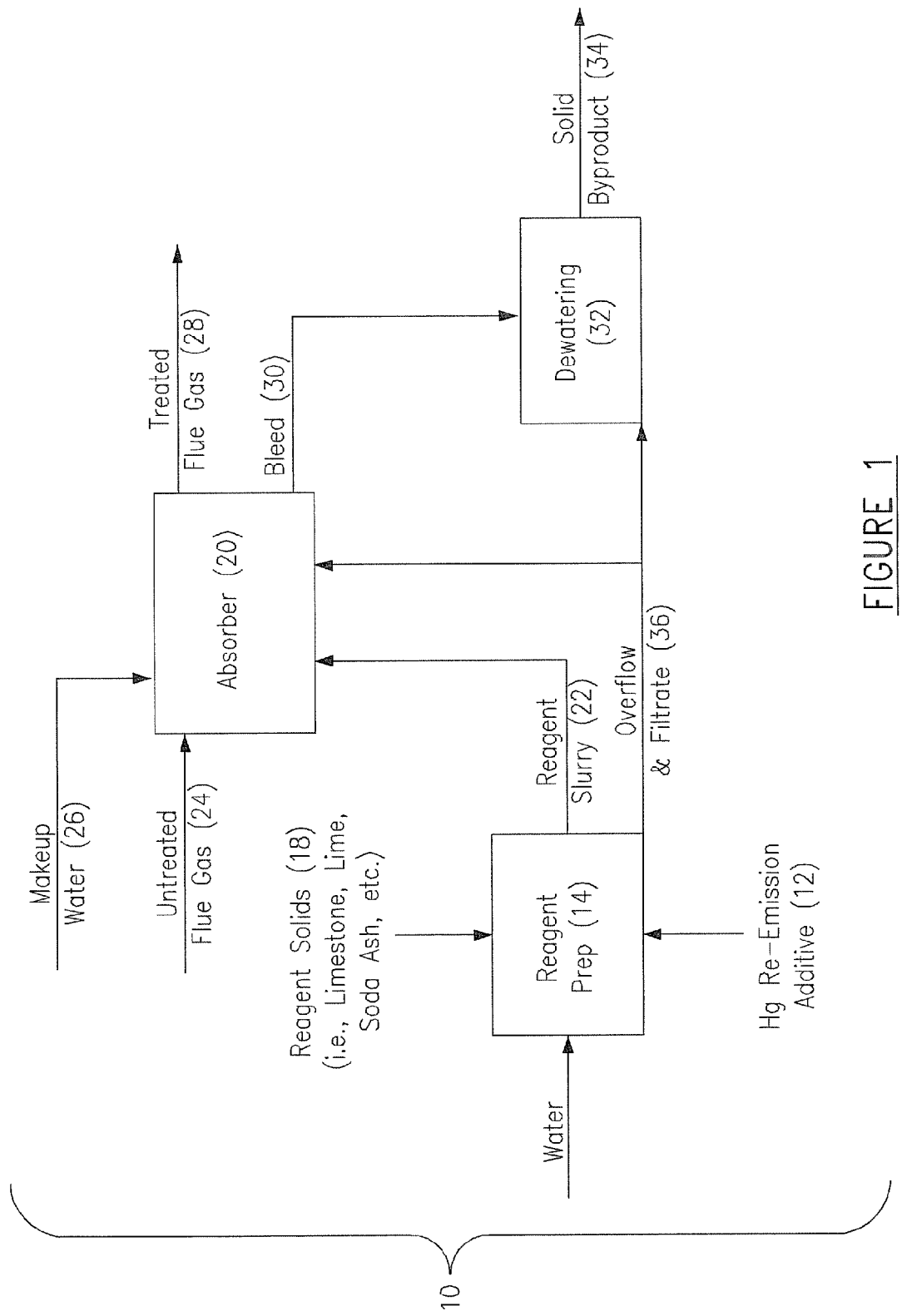
FIG. 1 is a schematic block diagram depicting a typical wet flue gas desulfurization system, wherein mercury re-emission additives are introduced to the wet flue gas desulfurization process with the reagent stream added for $SO_2$ removal.

FIG. 1 is a schematic block diagram depicting a typical wet flue gas desulfurization system 10, wherein one or more mercury re-emission additives 12 are introduced to the wet flue gas desulfurization process with the reagent stream added for $SO_2$ removal. The reagent liquor is prepared as a slurry at station 14 from water and reagent solids 18, and is provided to absorber 20. In this embodiment, the mercury re-emission additives of the invention are introduced to the wet flue gas desulfurization process with the slurried reagent stream 22 added for $SO_2$ removal. The flue gas 24 to be treated is provided to the absorber 20, as is makeup water 26, where contact between the inlet flue gas and the slurry results in the scrubbing of the flue gas. The treated flue gas 28 is discharged from the absorber 20 as a purified product.

The spent slurry is bled off at 30 and dewatered at 32, with the resulting solid by-product 34 being disposed of or available as a saleable commodity. The overflow and filtrate 36 from the dewatering is returned to the reagent preparation station 14 for use in slurry preparation, and returned to the absorber 20 as additional makeup water. With the exception of the re-emission additives 12, all of the foregoing procedures and apparatus are known in the prior art.

The method of the present invention represents a low cost means of adding mercury re-emission additives to the process at a rate that already varies based on the amount of $SO_2$ being absorbed. Since under controlled conditions the amount of $SO_2$ absorbed is an indicator of the amount of coal being combusted, the rate at which reagent is added to the process will correspond to the rate of mercury absorption.

Figure 2:
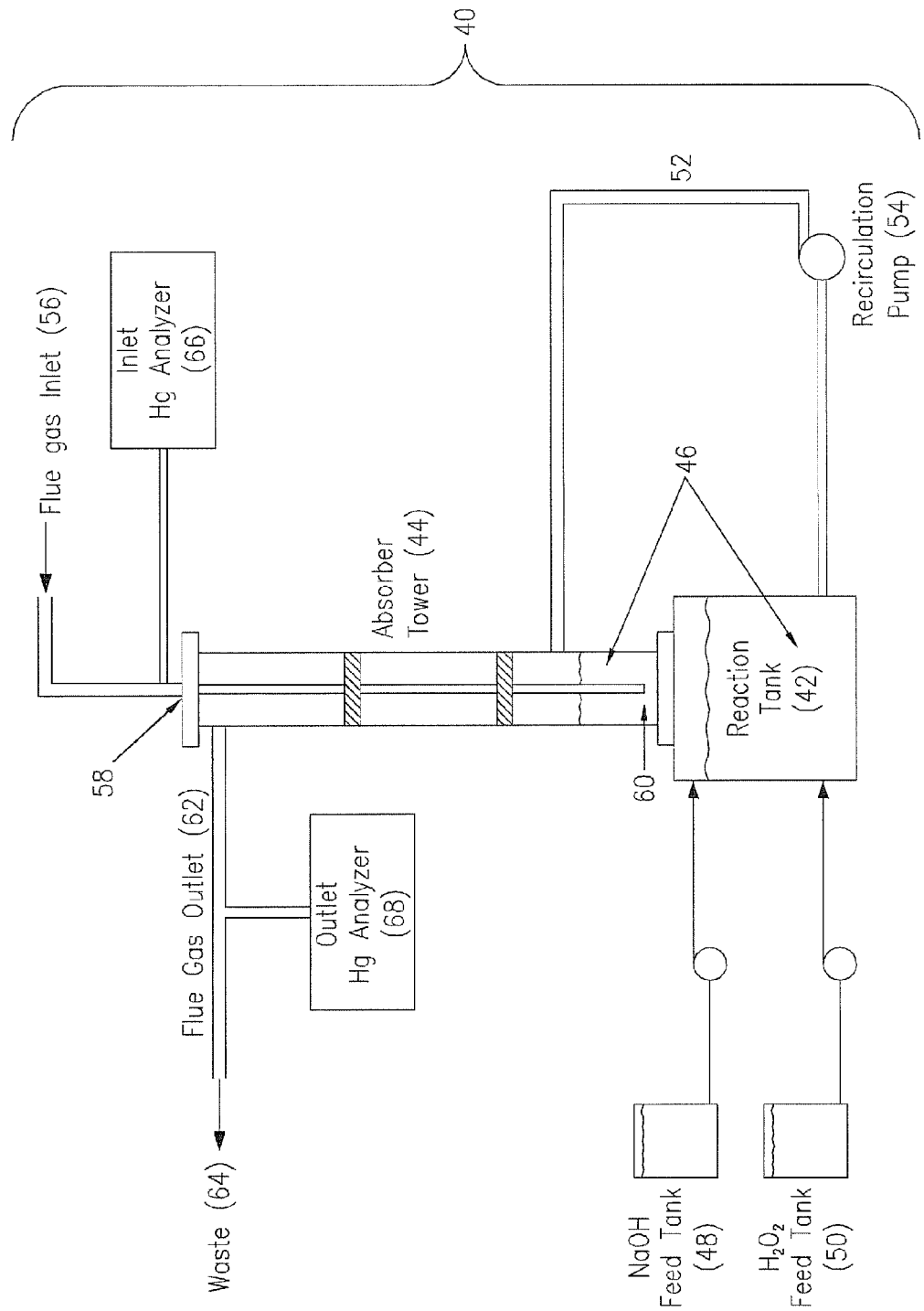
FIG. 2 is a schematic block diagram depicting a bench-scale wet flue gas desulfurization system.

FIG. 2 is a schematic block diagram depicting a laboratory scale wet flue gas desulfurization system 40. The system includes a reactor vessel 42 and absorber tower 44 containing FGD flue gas 56 and liquor 46. Feedback control loops are used: to maintain a constant pH through the addition of sodium hydroxide (NaOH) from feed tank 48; to maintain the sulfite concentration through the addition of hydrogen peroxide ($H_2O_2$) from feed tank 50; and otherwise to maintain a constant temperature. The liquor 46 from the reaction tank is passed via a loop 52 including recirculation pump 54, to the tower 44 where it forms a liquid column. The flue gas 56 provided to the tower 44 via inlet 58 exits at the bottom 60 of the column, and after bubbling upwardly through the liquor, where it is scrubbed by the liquor, exits at outlet 62 as the purified waste gas 64.

Tests were conducted using the system described above and shown in FIG. 2 to compare the efficacy of the present invention in comparison with other additives. The inlet and outlet mercury concentrations were measured in the flue gas at analyzers 66 and 68. Both total mercury (oxidized and elemental) and elemental mercury ($Hg^0$) were measured in a semi-continuous manner. All measurements were performed with the reaction tank operating at 131° F. and pH=5. Other parameters associated with the liquor or flue gas are shown below:

Liquor
100 mM $Cl^-$,
50 mM $SO_4^{-2}$,
15 mM $Ca^{+2}$,
Flue Gas Inlet
15-25 µg/Nm$^3$ $HgCl_2$, with trace amounts of $Hg^0$
12% $CO_2$,
3% $O_2$,
1000 ppm $SO_2$,
15 ppm HCl,
Balance nitrogen, and
24 L/min nominal total flow (dry basis).

Note that a solid phase was not present in these laboratory scale tests, unlike wet FGD units servicing utilities. In each test except the baseline test, a Hg re-emission additive was included in the liquor as a single spike at 0.05 mM. All chemicals were added to the liquid phase and the simulated flue gas was bubbled through the absorber tower until steady state was reached.

Figure 3:
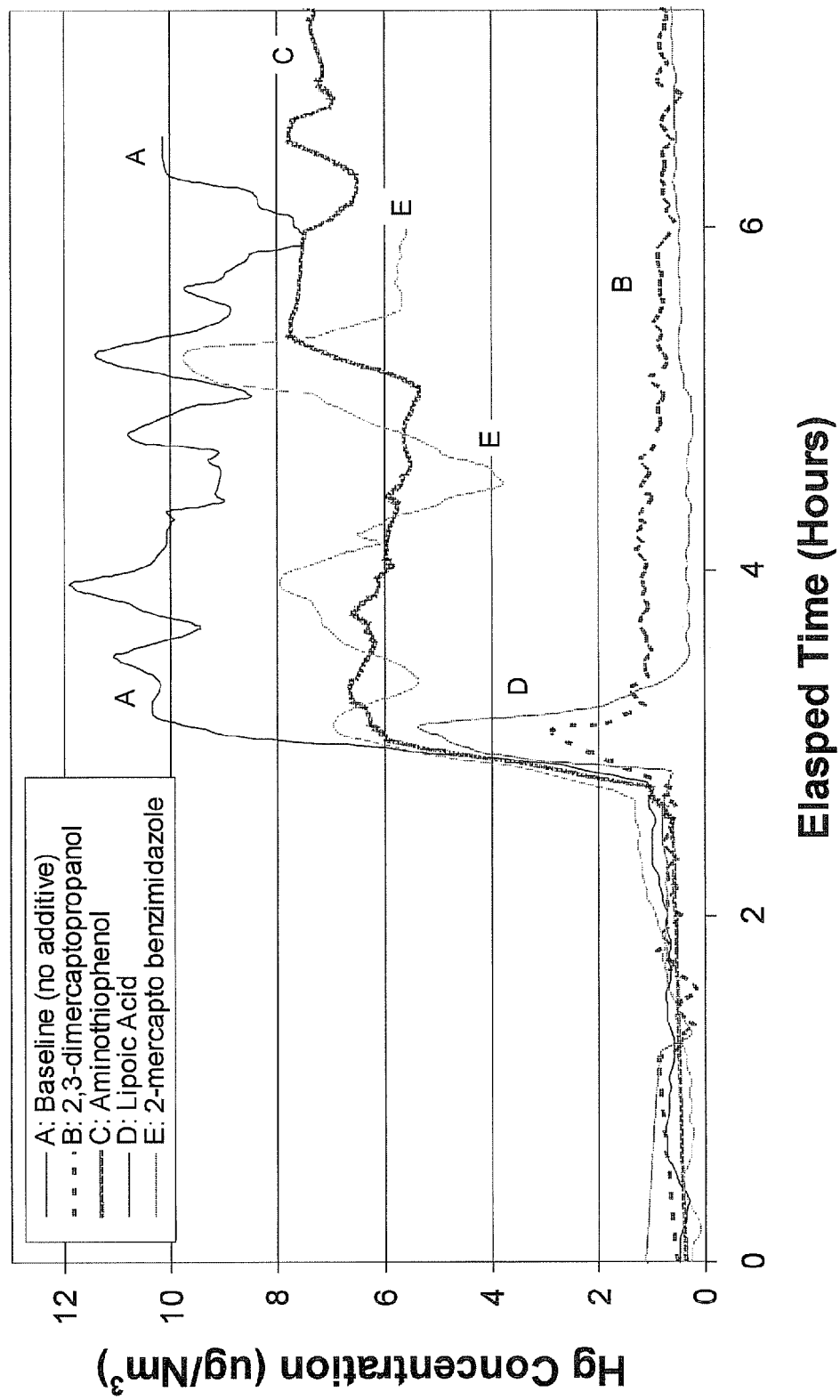
FIG. 3 is a graph showing the effect of a variety of additives on $Hg^0$ concentration in the outlet flue gas stream as a function of elapsed time.

The results of four different experiments are shown in FIG. 3, which is a plot of elemental mercury ($Hg^0$) in the outlet flue gas stream as a function of elapsed time. From time 0 until approximately 3 hours, the $Hg^0$ concentration was at or below detection limits (~1 µg/Nm$^3$). At approximately 3 hours, the amount of mercury being introduced into the system via the inlet flue gas was supplemented with an injection of soluble $Hg^{+2}$ in the form of $Hg(ClO_4)_2$. Mercury re-emissions are seen to immediately increase after this mercury spike.

In the baseline case (curve A), re-emissions are steady at nominally their initial values (~10 µg/Nm$^3$) for the duration of the experiment. Contrast the baseline case with the lipoic acid (1,2-dithiolane-3-valeric acid) additive, the results for which are depicted in curve D; or with curve B which depicts the results where the additive is 2,3-dimercaptopropanol. In these latter two instances the elemental mercury concentration initially increases with this surge in oxidized mercury but the re-emissions are quickly eliminated, as evidenced by the outlet elemental mercury concentration falling to the detection limit (~1 µg/Nm$^3$). Among the additional additives found to be effective in the present invention are the compounds dimercaptosuccinic acid; 1,8-octanedithiol; 2-methyl 1,3-dithiolane; mercaptoacetic acid, and the sodium salt of mercaptoacetic acid.

Two other additives (4-aminothiophenol and 2-mercapto benzimidazole) that were tested are also shown in FIG. 3 (curves C and E). These two chemicals were not seen to affect emissions as effectively as lipoic acid and 2,3-dimercaptopropanol; in fact, the mercury re-emission trends were the same as the baseline case for these additives. Both of these additives are technically organothiols, and yet both are ineffective for preventing mercury re-emissions. Thus, it will be clear that the group of additives delineated in the present invention possess the unexpected and unique properties that are effective for such a result. There are discernable chemical distinctions between the two groups of additives shown in FIG. 3: The chemicals used in curves B and D that eliminated re-emissions contain a dithiol or dithiolane group as well as a doubly-bounded oxygen (=O) and/or a hydroxyl (—OH) group, whereas the ineffective chemicals 4-aminothiophenol and 2-mercapto benzimidazole used in curves C and E contain a single thiol along with an amino functional group.

An additional additive, mercaptoacetic acid (MAA), was tested. In this case, the experiments were performed using a slurry from an operating utility. Both the liquid and solid phases were used in an effort to more closely mimic conditions encountered in full scale wet FGD system. The exact composition of the solid and liquid was not determined. Some of the test conditions were slightly modified to match the conditions of a utility scrubber; the changes are noted below.

Liquor pH 5.5

Flue Gas 1200 ppm $SO_2$ 5 ppm HCl 265 ppm NOx

In addition, instead of using sodium hydroxide and hydrogen peroxide to control pH and sulfite levels, reagent grade calcium carbonate and sparged air were used, respectively. All other conditions were the same as the tests presented in FIG. 3.

Figure 4:
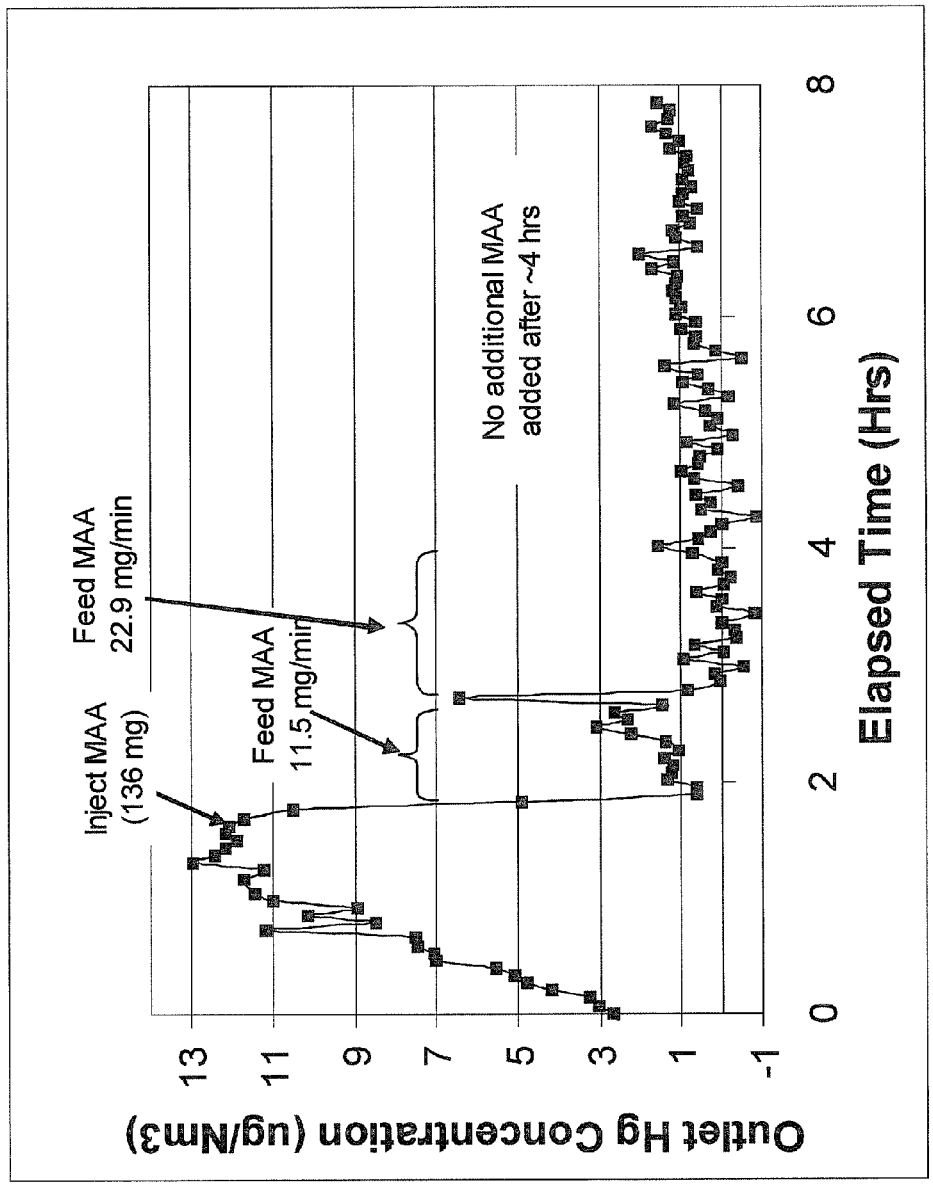
FIG. 4 is a graph showing the effect of mercaptoacetic acid on $Hg^0$ concentration in the outlet flue gas stream as a function of elapsed time.

FIG. 4 shows the gas phase outlet elemental mercury concentration as a function of the elapsed time since the start of the test. Since only trace amounts of elemental mercury are introduced in the gas phase, the high concentration of mercury at the scrubber outlet is clearly the result of re-emissions. Mercaptoacetic acid was spiked into the system to quickly introduce an inventory in the reactor and continued at a constant feed. The mercaptoacetic acid spike occurs at approximately 2 hours and is annotated on the graph. The mass of mercaptoacetic acid introduced corresponds to a concentration of 27 ppm or 0.3 mM. The test lasted approximately 6 hours after MAA was initially being added to the system.

The addition of mercaptoacetic acid to the system significantly reduced mercury re-emissions. As previously discussed, any gas phase mercury concentration value below ~1 $\mu g/Nm^3$ can be considered experimental noise and below the detection limit of the instrument. The final concentration of mercaptoacetic acid added during the test resulted in a concentration to 400 ppm or 4.3 mM by the end of the test, assuming the additive remained in the liquid phase and did not degrade.

Figure 5:
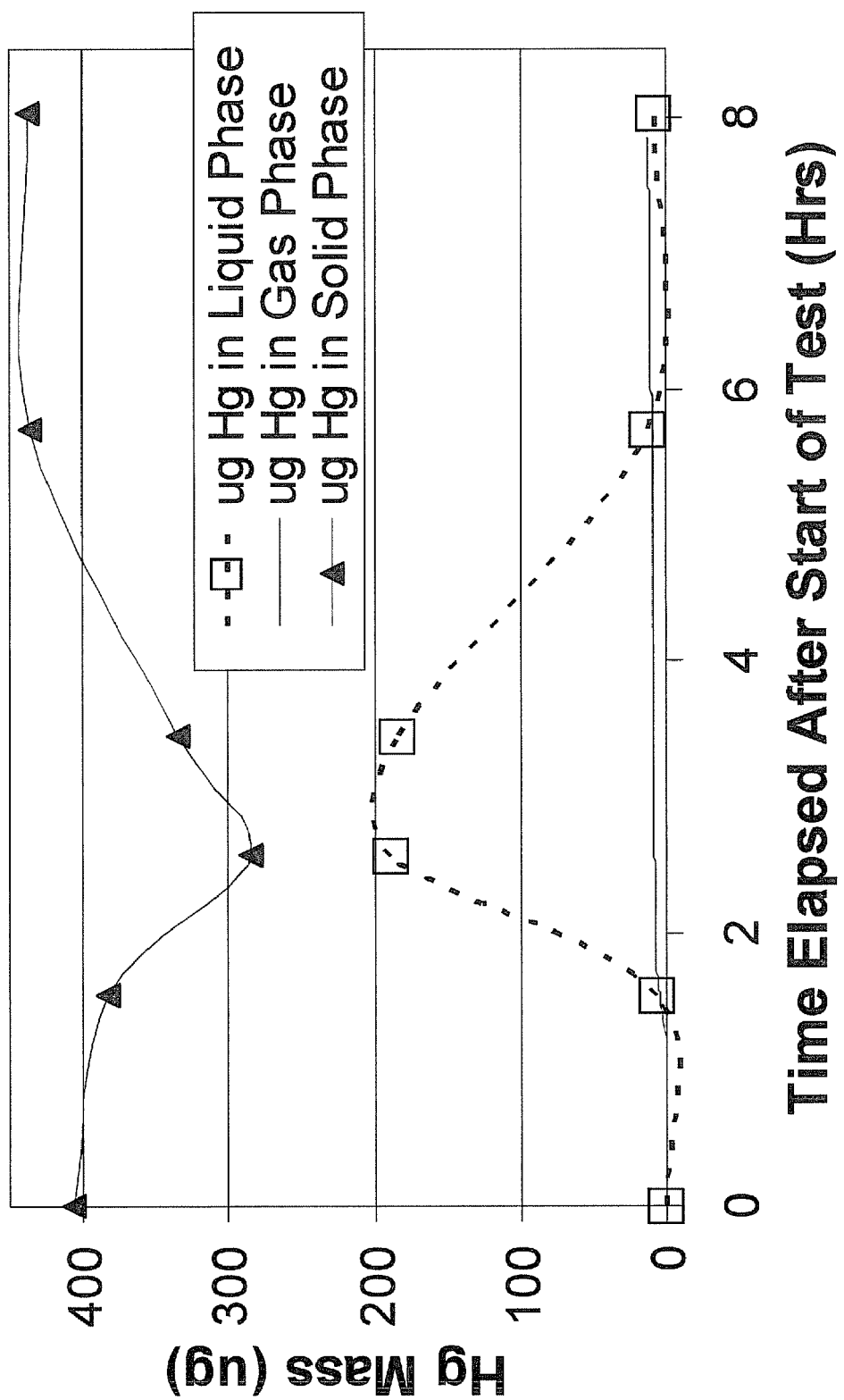
FIG. 5 is a graph showing the distribution of mercury in the solid, liquid and gas phase as a function of elapsed time during the active addition of mercaptoacetic acid.

Of interest is the fact that, as mercaptoacetic acid was being actively added to the FGD system, the mercury partitioning was affected, as shown in FIG. 5. The distribution of mercury in the solid, liquid and gas phase is shown in FIG. 5 as a function of elapsed time. At the beginning of the test, all of the mercury is in the solid phase (400 µg of mercury corresponds to a concentration of 1 µg/g). After the mercaptoacetic acid is introduced, the mercury is seen to partition to the liquid phase. The highest liquid phase mercury concentration seen at 2.5 hours is 50 µg/L. Relative to the mercury in the liquid and solid phases, little mercury exits the system as re-emitted mercury, which is evidenced in FIG. 4 and demonstrates the effectiveness of MAA.

A small parametric test matrix was also performed using mercaptoacetic acid. The pH and chloride levels were varied. The pH was tested at 4.7, 5.2, and 5.7, and chloride was tested at 5 mM and 50 mM levels. Instead of performing the tests with samples from a utility wet FGD, a synthetic slurry was prepared using calcium sulfate as the solid material. With the exception of the chloride level and pH, the liquid phase chemistry of the slurry was the same as it was for the results presented in FIG. 3. Reagent grade calcium carbonate and air were used to control pH and sulfite levels. The addition of mercaptoacetic acid, either as a single spike or metered into the system over time, was effective at controlling re-emissions. The results of these experiments are summarized in Table 1.

TABLE 1

| pH | Chloride Concentration (mM) | Outlet Hg concentration before MAA ($\mu g/Nm^3$) | Lowest Achievable Outlet Hg Concentration After MAA ($\mu g/Nm^3$) | Percent Hg Partition to Solid Phase |
|---|---|---|---|---|
| 4.7 | 5 | 37 | <1 | 97% |
| 4.7 | 50 | 3 | <1 | 100% |
| 5.2 | 5 | 34 | <1 | 27% |
| 5.2 | 50 | 5 | 1.5 | 5% |
| 5.7 | 5 | 13 | 1 | 93% |
| 5.7 | 50 | 4 | <1 | 98% |

For these conditions, an apparent ratio of 200-250 to 1 mercaptoacetic acid to mercury in the system seemed effective at eliminating re-emissions. It was observed that more mercaptoacetic acid was required at higher pH, while the mercury partitioning favored the liquid phase for the tests performed at pH 5.2.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of flue gas systems known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for reducing re-emissions of mercury from a wet flue gas desulfurization system comprising:
    adding an additive to scrubber liquor in the flue gas desulfurization system which interacts with mercury present in the flue gas to curtail the mercury re-emissions, wherein said additive is a dithiol, and wherein the dithiol has either an oxygen group or a hydroxyl group.

2. A method for reducing re-emissions of mercury from a wet flue gas desulfurization system comprising:
    adding an additive to scrubber liquor in the flue gas desulfurization system which interacts with mercury present in the flue gas to curtail the mercury re-emissions, wherein said additive is 2,3-dimercaptopropanol.

3. A method for reducing re-emissions of mercury from a wet flue gas desulfurization system comprising:

adding an additive to scrubber liquor in the flue gas desulfurization system which interacts with mercury present in the flue gas to curtail the mercury re-emissions, wherein said additive is 1,8-octanedithiol.

4. A method for reducing re-emissions of mercury from a wet flue gas desulfurization system comprising:
adding an additive to scrubber liquor in the flue gas desulfurization system which interacts with mercury present in the flue gas to curtail the mercury re-emissions, wherein said additive is a dithiolane.

5. The method of claim 4, wherein the dithiolane has either an oxygen group or a hydroxyl group.

6. The method of claim 4, wherein the dithiolane is 1,2-dithiolane-3-valeric acid.

7. The method of claim 4, wherein the dithiolane is 2-methyl 1,3-dithiolane.

8. A method for reducing re-emissions of mercury from a wet flue gas desulfurization system comprising:
supplying an additive to scrubber liquor in the flue gas desulfurization system in a sufficient quantity to reduce the re-emission of mercury; wherein said additive is a dithiol, wherein the dithiol has either an oxygen group or a hydroxyl group; and
scrubbing the wet flue gas with the scrubber liquor containing the additive.

9. A method for reducing re-emissions of mercury from a wet flue gas desulfurization system comprising:
supplying an additive to scrubber liquor in the flue gas desulfurization system in a sufficient quantity to reduce the re-emission of mercury; wherein said additive is 2,3-dimercaptopropanol; and
scrubbing the wet flue gas with the scrubber liquor containing the additive.

10. A method for reducing re-emissions of mercury from a wet flue gas desulfurization system comprising:
supplying an additive to scrubber liquor in the flue gas desulfurization system in a sufficient quantity to reduce the re-emission of mercury; wherein said additive is 1,8-octanedithiol; and
scrubbing the wet flue gas with the scrubber liquor containing the additive.

11. A method for reducing re-emissions of mercury from a wet flue gas desulfurization system comprising:
supplying an additive to scrubber liquor in the flue gas desulfurization system in a sufficient quantity to reduce the re-emission of mercury; wherein said additive is a dithiolane, wherein the dithiolane has either an oxygen group or a hydroxyl group; and
scrubbing the wet flue gas with the scrubber liquor containing the additive.

12. A method for reducing re-emissions of mercury from a wet flue gas desulfurization system comprising:
supplying an additive to scrubber liquor in the flue gas desulfurization system in a sufficient quantity to reduce the re-emission of mercury; wherein said additive is 1,2-dithiolane-3-valeric acid; and
scrubbing the wet flue gas with the scrubber liquor containing the additive.

13. A method for reducing re-emissions of mercury from a wet flue gas desulfurization system comprising:
supplying an additive to scrubber liquor in the flue gas desulfurization system in a sufficient quantity to reduce the re-emission of mercury; wherein said additive is 2-methyl 1,3-dithiolane; and
scrubbing the wet flue gas with the scrubber liquor containing the additive.

* * * * *